United States Patent [19]

Kono

[11] 4,139,169
[45] Feb. 13, 1979

[54] REEL DISC DEVICE IN A RECORDING AND/OR REPRODUCING APPARATUS

[75] Inventor: Makoto Kono, Yokohama, Japan

[73] Assignee: Victor Company of Japan, Ltd., Yokohama, Japan

[21] Appl. No.: 897,540

[22] Filed: Apr. 17, 1978

[30] Foreign Application Priority Data

Apr. 19, 1977 [JP] Japan .................. 52-44136

[51] Int. Cl.² .............................................. G03B 1/04
[52] U.S. Cl. ..................... 242/201; 242/204
[58] Field of Search ................. 242/200–202, 242/204, 210; 360/73, 74, 85, 132; 74/368, 356, 750 R, 758

[56] References Cited

U.S. PATENT DOCUMENTS

| | | | |
|---|---|---|---|
| 2,664,251 | 12/1953 | Berlant | 242/202 |
| 3,218,877 | 11/1965 | Kaplan | 74/368 |
| 3,888,432 | 6/1975 | Katoh | 242/201 |
| 3,911,492 | 10/1975 | Ura | 360/85 |

*Primary Examiner*—Leonard D. Christian
*Attorney, Agent, or Firm*—Haseltine, Lake & Waters

[57] ABSTRACT

A reel disc device is used in a recording and/or reproducing apparatus having means including a capstan and a pinch roller for driving a tape to travel selectively in a normal direction and a reverse direction and drive means for rotatingly driving the reel disc device. The reel disc device comprises a disc for engaging a reel and rotating the same unitarily therewith, a brake disc disposed below and as a separate structure from said reel engaging disc, a clutch mechanism disposed between said reel engaging disc and said brake disc and adapted so that, when said reel engaging disc rotates in a tape drawing out direction, that is, the normal direction, said reel engaging disc is operatively connected to said brake disc to rotate said brake disc in the same normal direction and, when said reel engaging disc rotates in a tape winding up direction opposite to said normal direction, that is, in the reverse direction, connection between said reel engaging disc and said brake disc is released, means for exerting a braking force on said brake disc rotating in the normal direction which means is responsive to fluctuations in the tape-tension, a driving disc driven by said drive means to rotate in the reverse direction, when said tape is wound up, and a rotation transmission mechanism operated by the rotation of said driving disc and adapted to cause said reel engaging disc to rotate in the reverse direction and said brake disc to rotate in the normal direction.

8 Claims, 11 Drawing Figures

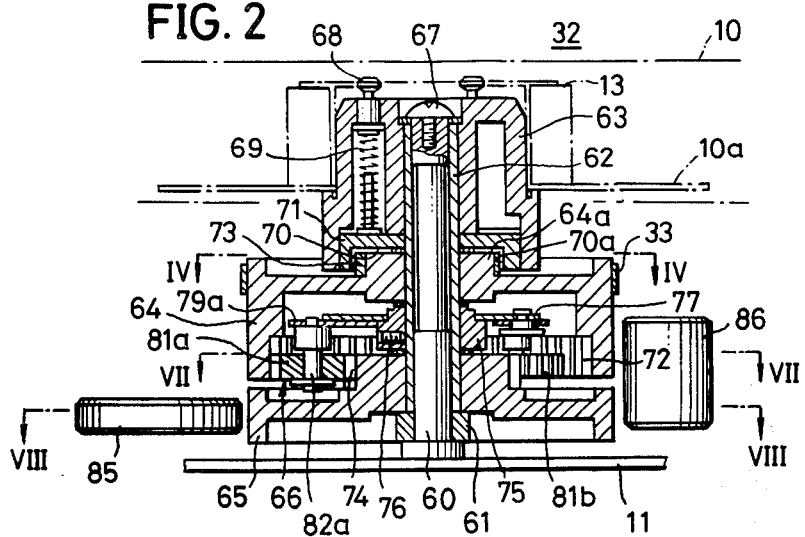
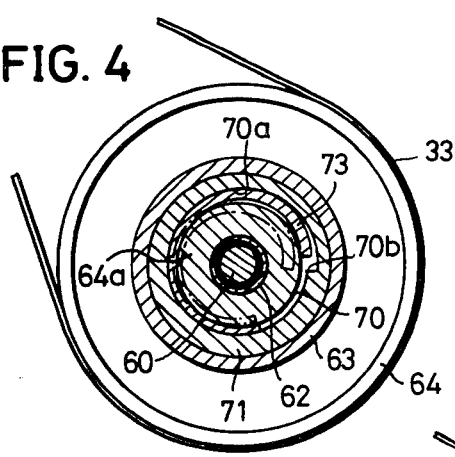
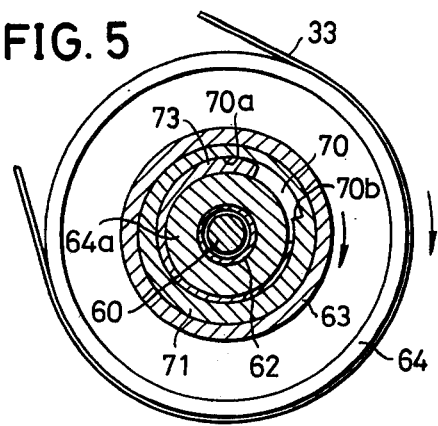
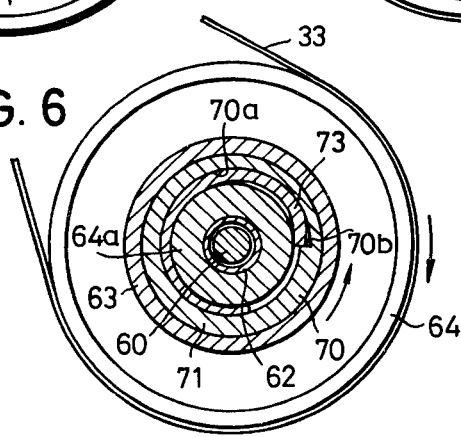

REEL DISC DEVICE IN A RECORDING AND/OR REPRODUCING APPARATUS

BACKGROUND OF THE INVENTION

The present invention relates to a reel disc device for use in a recording and/or reproducing apparatus and more particularly to a reel disc apparatus which can be controlled in accordance with fluctuations in tape-tension both in normal recording and reproducing mode where the tape runs in the normal direction and in a reverse reproducing mode where the tape runs in the reverse direction.

There have been developed apparatuses for recording and reproducing video signals on or from a magnetic tape which have a mode of operation which permits editing of the recorded tape. Apparatuses of this type have the ordinary functions in which the tape travels in the normal direction at a predetermined speed for recording or reproducing operation an another function in which the tape travels in the reverse direction at a predetermined speed for reproducing operation. This reverse reproducing operation is used in the process of editing the recorded tape in order to locate the place on a tape where a specific video signal has been recorded. In the reverse reproducing mode, the tension of the tape running in the reverse direction must be controlled as it is in the normal recording and/or reproducing mode.

The supply-side reel disc assembly and the tension servo mechanism in ordinary recording/reproducing apparatuses are constructed with a brake band which is connected to a tension lever and surrounds a disc with which the reel is engaged. This mechanical tension servo mechanism is generally adapted to operate normally only when the aforementioned disc rotates in a predetermined direction. In the reverse reproducing operation, however, this disc must rotate in the direction opposite the predetermined direction in which the servo-mechanism operates normally and, consequently, it is impossible for the mechanical tension servo mechanism known heretofore to operate normally in reverse reproducing mode as well as in the normal recording and/or reproducing mode.

Accordingly, the recording/reproducing apparatuses having reverse reproducing function known heretofore have one motor for rotating the take-up reel shaft and another motor for rotating the supply reel shaft and the tape tension is controlled electrically by controlling the motors. This arrangement is disadvantageous since it makes the recording/reproducing apparatus bulky, increases its weight and raises the cost of production.

SUMMARY OF THE INVENTION

Accordingly, it is a general object of the present invention to provide a novel and useful reel disc device in a recording/reproducing apparatus in which the above described disadvantages have been overcome.

A specific object of the invention is to provide a reel disc device wherein, in the reverse reproducing mode, a brake disc to which a braking force is imparted by a brake member rotates in the same direction as in the normal recording/reproducing mode, whereby the same mechanical tension servo mechanism operates in exactly the same manner in all modes of operation.

Another object of the invention is to provide a reel disc device wherein a planetary gear mechanism is incorporated therein, and a brake disc is thereby rotated in the same direction in the reverse reproducing mode and normal recording/reproducing mode.

Other objects and further features of the invention will be apparent from the following detailed description when read in conjunction with the accompanying drawings.

BRIEF DESCRIPTION OF THE DRAWINGS

In the drawings:

FIG. 2 is a vertical section taken along II—II in FIG. 1, showing one embodiment of a reel disc device of according to the present invention;

FIG. 4 is a transverse section taken along IV—IV in FIG. 2, showing a one-way clutch mechanism incorporated in the reel disc device;

FIGS. 5 and 6 are sectional views showing a one-way clutch mechanism illustrated in FIG. 4, at the time of normal recording/reproducing mode and reverse reproducing mode respectively;

DETAILED DESCRIPTION

First one example of a recording/reproducing apparatus of an automatic tape loading type in which one embodiment of the reel disc device of the invention has been applied will be described with reference to FIG. 1.

Figure 1:
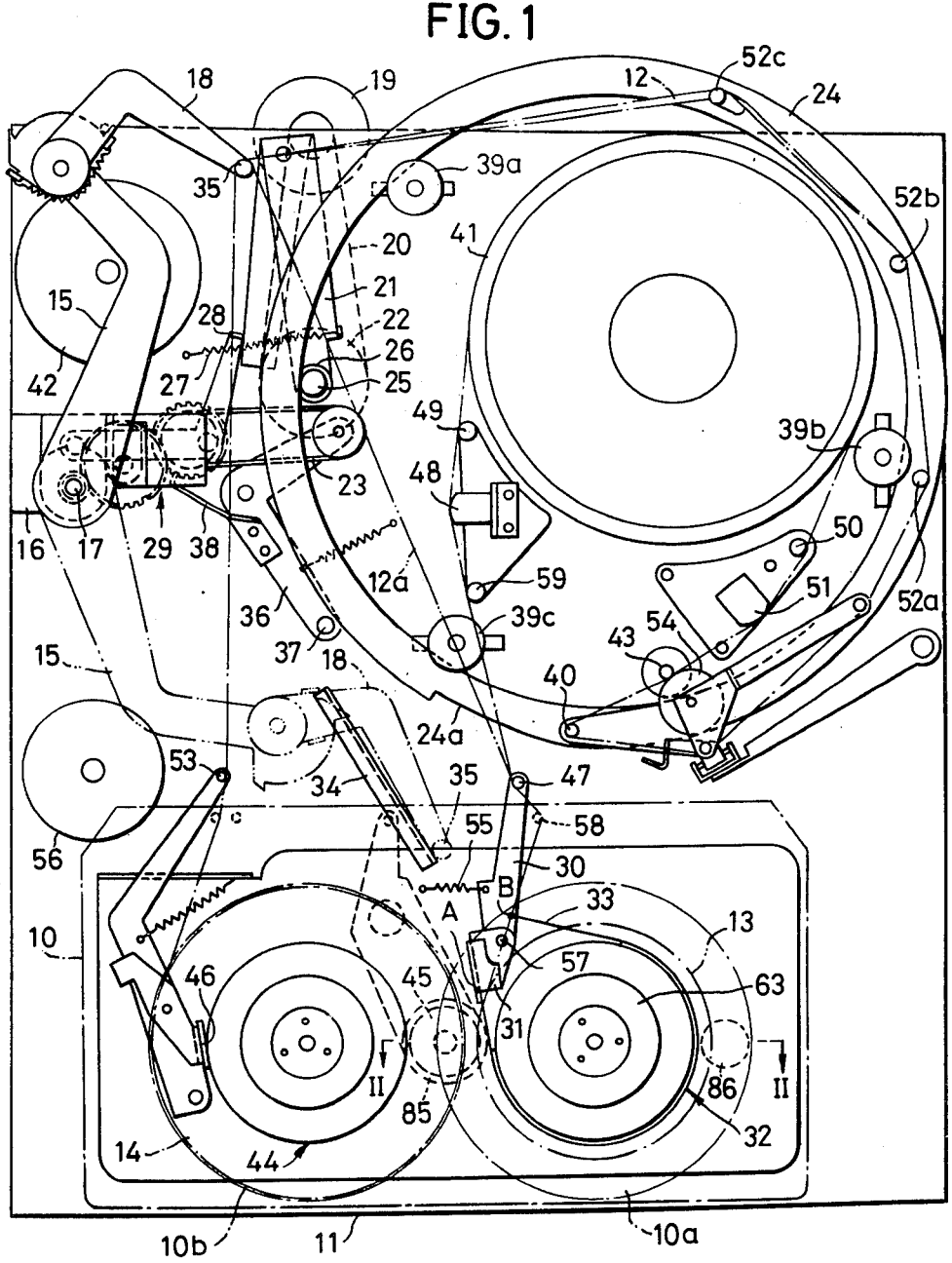
FIG. 1 is a plan view of one example of a recording/reproducing apparatus in which one embodiment of a reel disc device according to the present invention is applied.
Figure 3:
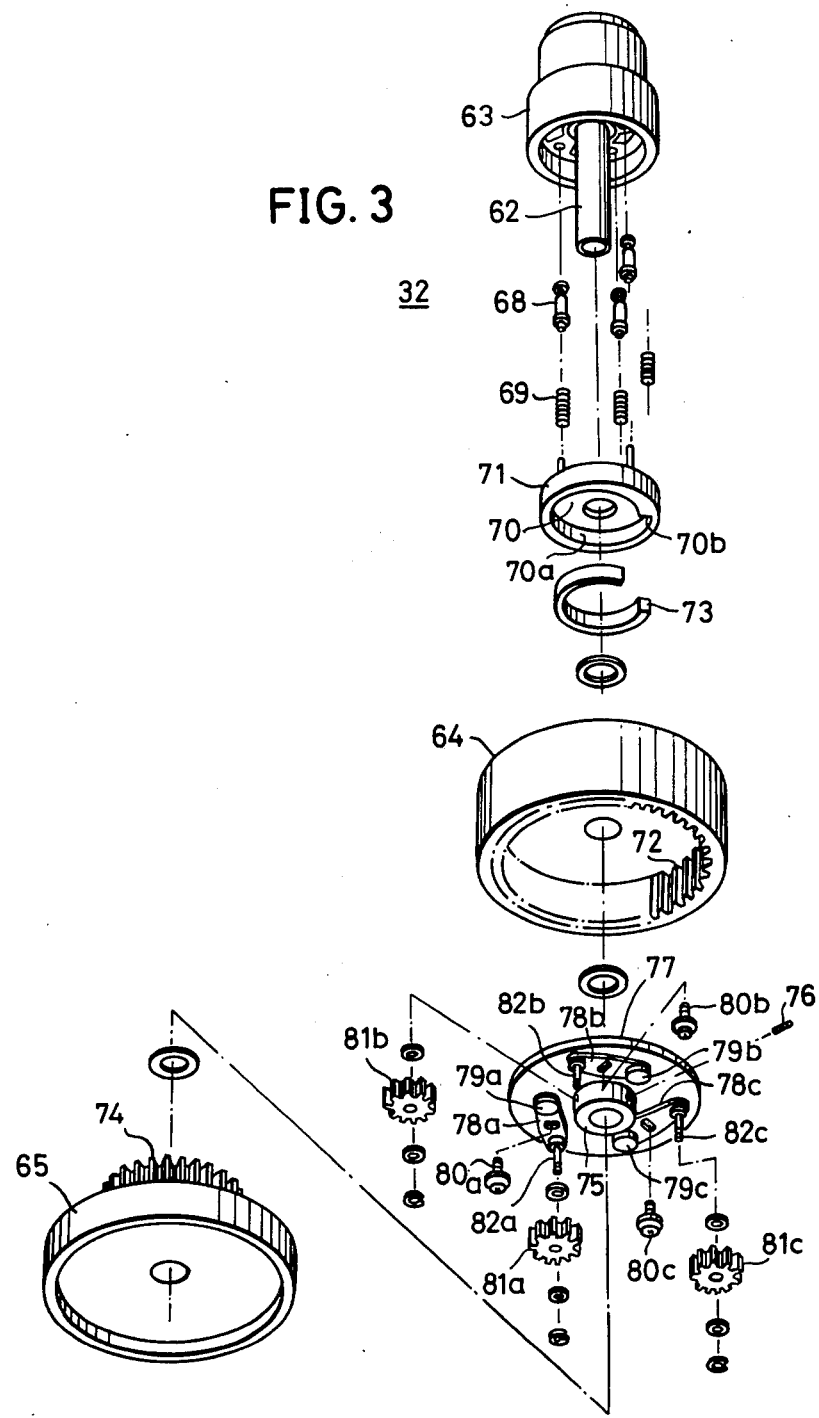
FIG. 3 is an exploded perspective view, as viewed from the bottom, showing the reel disc device illustrated in FIG. 2.

In the recording/reproducing apparatus illustrated in FIG. 1, a tape cassette 10 is loaded in a specific position on the chassis 11 of the apparatus. Cassette 10 contains a pair of reels 10a and 10b on which a magnetic tape 12, ¾ inch in width, is wound to form a supply side tape roll 13 and a take-up side tape roll 14. An L-shaped guide lever 15 is fixed at its base end to the upper end of a rotatable shaft 17 held rotatably and vertically by a holding structure 16. At its free end, lever 15 pivotally supports one end of another L-shaped guide lever 18, which is freely rotatable within a specific angular range.

When a PLAY button (not shown) of the apparatus is depressed, a motor 19 rotates for loading. Motor 19 produces an output which is transmitted by way of a belt 20 (with a clockwise rotation) to a pulley 22 rotatably supported on the free end of the upper arm of a U-shaped lever 21, with parallel upper and lower arms. This rotation of the pulley 22 causes driving rollers 26 and 25, a belt 23, and a revolving ring 24 to rotate unitarily. The lever 21 is urged to rotate clockwise by a spring 27. When the apparatus is in the disengaged state, the lower arm of this lever 21 is caught by a bent portion of an L-shaped lever 28 and is thereby restricted in rotation. At this time, the ring driving roller 25 is separated from the inner circumferential surface of the revolving ring 24. The belt driving roller 26 is pressed against the belt 23.

Consequently, the rotation of the motor 19 is transmitted by way of the belt 20, the belt driving roller 26, and the belt 23 to a pulley. Then, the motor power is sent through a speed reducing mechanism 29, within the holding structure 16, to the rotatable shaft 17, which turns counterclockwise with a reduced speed.

Moreover, a tension lever 30 is urged by a tension spring 55 to rotate in the counterclockwise direction about a shaft 57 until it reaches its operating position and tensions. Brake band 33 anchored at one end to a holder 31 fixed to the chassis 11 and at the other end to a pin embeddedly fixed to the lever 30. This brake band surrounds a supply side reel disc assembly 32 which constitutes the essential part of the invention. Consequently, the servo-mechanism comprising the cooperatingly functioning tension lever 30, and a brake band 33 is placed in an operating state.

As a result of the aforementioned rotation of the shaft 17, the L-shaped guide lever 15 is rotated in the counterclockwise direction from the position indicated by a two-dot chain line in FIG. 1. The L-shaped guide lever 18 moves together with the counterclockwise rotation of the lever 15 while simultaneously rotating clockwise about its own pivot point and as it is guided by a guide member 34. During this operation, a guide pole 35, fixed on the free end of the lever 18, is extracted from the interior of the cassette 10, to catch the tape 12 and draw it out of the cassette. When the L-shaped levers 15 and 18 are rotated to the positions indicated in solid lines in FIG. 1, the tape 12 is drawn outside of the cassette and formed into a tape loop 12a of substantially triangular shape.

Furthermore, during the operation, a pin embeddedly fixed to the outer end of one arm of the L-shaped lever 28 fits into a recessed part of a cam (not shown). The cam rotates unitarily with the aforementioned shaft 17, and the lever 28 is rotated counterclockwise by the U-shaped lever 21 which is urged by the spring 27. The driving roller 25 presses against the internal circumferential surface of the ring 24. The output rotation of the motor 19 is thereby transmitted through the driving roller 25 to the ring 24, which starts to rotate in the clockwise direction.

As the ring 24 thus starts to rotate, an L-shaped lever 36 is rotated clockwise against the force of a spring as a pin 37 fixed to the outer end of one arm of this lever 36 lifts out of a recessed portion 24a formed in the outer peripheral edge of the ring 24, and reaches a position of contact against the outermost peripheral edge of the ring. As a consequence, the belt 23 separates from the driving roller 26. Driving power transmitted to the shaft 17 is cut off, and the revolving ring 24 thereafter revolves by itself. As a result of the clockwise rotation of the L-shaped lever 36, the outer free end of a lock lever 38 (fixed at its base part to one arm of the lever 36) enters the space between two teeth of one gear forming the speed reducing mechanism 29. The shaft 17 and L-shaped levers 15 and 18 are positively locked in the positions indicated by the solid lines in FIG. 1. The revolving ring 24 is rotatably supported with an inclination such that the right lower side thereof as viewed in FIG. 1, is at the lowest position by guide rollers 39a, 39b, and 39c.

As a result of the revolving of the ring 24, a tape guide pole 40 turning therewith advances into tape loop 12a, from its underside. Then, as this pole 40 withdraws out of this loop, it catches the tape 12. In a continuous action, in accordance with the revolving motion of the ring 24, pole 40 pulls tape 12 around the cylindrical surface of a guide drum 41. This guide drum 41 has an upper guide drum and a lower guide drum, which is fixed to the chassis 11. The upper guide drum, which is separated very slightly from the lower guide drum, contains a rotary video head exposed outwardly from its cylindrical surface.

When the revolving ring 24 has revolved to the terminal position indicated in FIG. 1, and has pulled the tape 12 around the guide drum 41, this completes the operation of loading the magnetic tape 12 in the predetermined tape path. Moreover, a pinch roller 54 is pressed against a capstan 43 with the magnetic tape interposed therebetween. A brake shoe 46 is moved to a position-for contacting a reel disc assembly 44. The magnetic tape 12 is drawn out of the cassette 10 from the supply side tape roll 13 and is guided by a guide pin 58 provided within the cassette. The tape is maintained at a constant tension by a tension pole 47 and is guided by a guide pole 59 to come in wrapping contact with an erasing magnetic head 48. Guide poles 49 and 50 wrap the tape in a helical form around a specific angular range of the cylindrical surface of the guide drum. The tape is placed in wrapping contact with an audio-control magnetic head 51, and is clamped between the capstan 43 and the pinch roller 54. The tape then turns back at the guide pole 40 and is guided by guide poles 52a, 52b, and 52c fixed to the upper face of the revolving ring 24. The tape passes by the guide pole 35, is maintained at constant take-up side tension by a tension pole 53, enters the cassette 10, and is taken up on the take-up side tape roll 14.

Next, the supply side reel disc assembly 32, which constitutes the essential part of the present invention, and the mechanical tape-tension servo-mechanism which operates cooperatively with the reel disc assembly 32 will be described in reference to FIGS. 2 through 4 and FIGS. 7 and 8. In these figures, the same parts are designated by like reference numerals.

The supply reel disc assembly 32 is comprised mainly of a cylindrical bearing sleeve 62 which is fitted rotatably on a shaft 60 extending vertically on the chassis 11 and is supported at its bottom by a spacer 61, an upper disc 63 for engaging the reel 10a, an intermediate brake disc 64, a lower driving disc 65, and a planetary gear mechanism 66.

The reel engaging disc 63 is fixed to the top of the bearing sleeve 62 and is prevented from being displaced upwards by a screw 67. Three reel engagement pins 68 each associated with a coil spring 69 are built into the disc 63. A cam member 71 is formed with a cam groove 70 having an arcuate wall surface 70a, as indicated in FIG. 4, and is fitted into and fixed on the bottom of the disc 63.

The brake disc 64 has a relatively flat hollow cylinder closed at the top, and is rotatably engaged with the bearing sleeve 61. The brake band 33 surrounds the peripheral surface of this disc 64. An internal gear 72 is formed on the lower inner peripheral surface of the disc 64.

A cylindrical projection 64a formed on the top of the disc 64 and a clutch ring 73 of substantially three-quarter circular shape fitted onto the projection 64a are inserted into and engaged by the cam groove 70. The clutch ring 73 is molded of a synthetic resin material into the shape indicated by a two-dot chain line in FIG. 4. This clutch ring 73 is accordingly fitted to the cylindrical projection 64a in a forcedly opened state and is thereby elastically energized in the constricting direction. Accordingly at an initial stage of the operating mode, the clutch ring 73 rotates unitarily with the brake disc 64, as will be described hereinafter. The shape of this clutch ring 73 is such that its thickness in the radial direction tapers from one of its ends to the other. The clutch ring 73, the cam groove 70 and the cylindrical projection 64a constitute a one-way clutch mechanism.

The driving disc 65 is supported at its bottom by the spacer 61 and is rotatably engaged with the bearing sleeve 62. An external gear 74, operating as solar gear, is formed around a center projection of the disc 65. The discs 65 and 64 have the same outer diameter.

A hub 75 is fixed to the bearing sleeve 62 by a screw 76. A disc plate 77 is force-fitted onto the hub 75. Three arms 78a, 78b, and 78c, disposed on the lower surface of the disc plate 77, are rotatably supported at their proximal ends by pins 79a, 79b, and 79c which have heads, and are screw-fastened, after their positions are adjusted, by screws 80a, 80b, and 80c passing through slots formed therein.

Pinions 81a, 81b, and 81c, which operate as planet gears, are rotatably supported on shafts 82a, 82b, and 82c embeddedly fixed on the arms 78a, 78b, and 78c at their distal ends. The pinions 81a, 81b, and 81c are disposed so as to be equally spaced in the circular direction, and are meshed with the internal gear 72 and the external gear 74. The pinions 81a, 81b, and 81c, the internal gear 72, and the external gear 74 cooperatively constitute the planetary gear mechanism.

A driving roller 85 is positioned to confront the outer peripheral surface of the disc 65. This roller 85 is normally separated from the disc 65 as indicated by the solid line in FIG. 8, and is pressed against the outer peripheral surface of the disc 65 as indicated by the two-dot chain line in the same figure in the reverse reproducing mode, the ordinary rewinding mode, and the rewinding mode for searching. A rewinding idle wheel 86 is positioned to confront with the outer peripheral surfaces of the brake disc 64 and the driving disc 65. This idle wheel 86 is normally separated from both discs as indicated by the solid lines in FIGS. 7 and 8, and is pressed against both discs as indicated by the two-dot chain line in the same figure in the ordinary rewinding mode and rewinding mode for searching.

Figure 8:
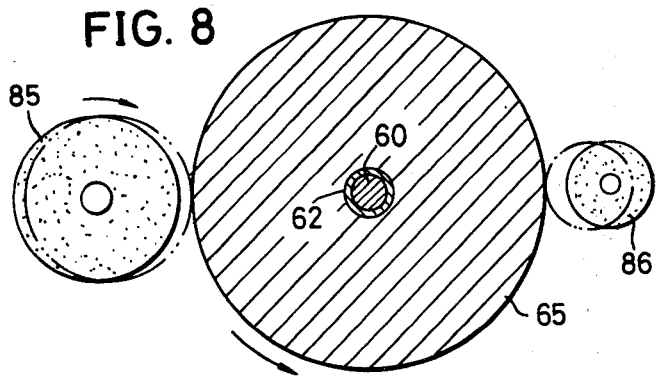
FIG. 8 is a transverse sectional view taken along VIII—VIII in FIG. 2.

In the tape-tension servo-mechanism comprising the brake band 33, the tension lever 30, the spring 55, and the tension pole 47, indicated in FIGS. 1, 4 and 8, a stationary terminal A of the brake band 33 anchored to the holder 31 at a position reached by traveling in the clockwise direction along the brake band 33 from a movable terminal B thereof anchored to the tension lever 30 and caused to move unitarily therewith. For this reason, the tape-tension servo-mechanism operates normally when the brake disc 64 rotates in the direction which causes the brake band 33 to slacken due to the frictional force between it and the brake disc 64, that is, when the brake disc 64 rotates in the clockwise direction. On the other hand, when the brake disc 64 rotates in the counterclockwise direction, the brake band 33 operates to bind the disc 64. This causes the tension lever 30 to swing irregularly, that is, to hunt, and the tape-tension controlling operation becomes unstable.

Next a description will be given of the operation of the device of the above described construction according to the present invention in each operating mode.

Normal Recording/Reproducing Mode:

The tape recording/reproducing apparatus assumes the state indicated in FIG. 1, and a main motor 42 and a DC motor 56 begin to rotate. This main motor 42 rotates the upper guide drum at a high speed in the clockwise direction and rotates a driving roller 45 to rotate clockwise to cause the take-up reel disc assembly 44 to rotate counterclockwise. The rotation of the DC motor 56 is speed-reduced and transmitted to the capstan 43 causing it to rotate clockwise at a predetermined speed. The tape 12 is clamped between the capstan 43 and the pinch roller 54 and is driven by the capstan 43 to run in the normal direction at a predetermined speed. In this condition, video signals are recorded on or reproduced from tape 12.

The driving roller 85 and the rewinding idle wheel 86 are held out of contact with the supply reel disc assembly 32 and the assembly is therefore not imparted with a tape winding force. As the tape 12 travels in the normal direction and is pulled out from the tape roll 13, the disc 63 with which the reel is engaged rotates together with the cam member 71 in the clockwise direction in FIGS. 1 and 4. The cam member 71 initially rotates a slight amount independently of the brake disc 64 to which the braking force is imparted by the brake band 33 and of the clutch ring 73 fitted to the brake disc thus causing the clutch ring 73 to edge into the narrow groove width part of the cam groove 70. Accordingly, the frictional force generated between the outer surface of the clutch ring 73 and the wall surface 70a, and between the inner surface of the clutch ring 73 and the outer peripheral surface of the projection 64a becomes large, and the rotation of the reel engaging disc 63 is thereby transmitted by way of the clutch ring 73 to the brake disc 64. Consequently, the disc 64 rotates clockwise unitarily with the disc 63 overcoming the braking force imparted by the brake band 33.

Accordingly, the braking force exerted on the brake disc 64 by the brake band 33 changes as the brake band 33 is tensioned or relaxed depending on displacement of the tension pole 47 for detecting the tape-tension, whereby the tape-tension at the tape supply side is controlled to be constant. More specifically, when rate of feed out of the tape from the tape roll 13 increases the tape tension descreases so that the brake band 33 is tensioned to increase the load on the tape 12. This causes the rate of tape feed-out to be reduced so that the tape-tension begins to rise. Conversely, when the rate of tape feed-out decreases, the tape-tension increases so that the brake band 33 is relaxed to decrease the load on the tape. This causes the rate of tape feed-out to be increased so that the tape tension begins to fall.

Reverse Reproducing Mode:

In editing the tape, the reverse reproducing mode of operation is used. In this mode of operation, the tape 12 is threaded and loaded as shown in FIG. 1. Then the DC motor 56 rotates in the opposite direction, the driving roller 45 is separated from the take-up reel disc assembly 44, and the other driving roller 85 rotating clockwise is pressed against the disc 65 of the supply reel disc assembly 32 as indicated by two-dot chain line in FIG. 8.

The reverse rotation of the DC motor 56 is transmitted to the capstan 43 causing it to rotate counterclockwise at a predetermined speed. The tape 12 is clamped between the capstan 43 and the pinch roller 54 and driven by the capstan 43 to traveling in the reverse direction at a predetermined normal speed. Accordingly, the magnetic tape 12 is drawn from the take-up tape roll 14 and is guided by the guide poles 52c, 52b, and 52a on the ring 24, and is then passed through the pinch-driving section. Then, the tape 12 is placed in contact with the audio-control head 51, where the audio signals and control signals are reproduced. The tape 12 then travels around the peripheral surface of the guide drum 41, where the recorded video signals are reproduced in the reverse time sequence, and thereafter reaches the supply tape roll 13.

Figure 7:
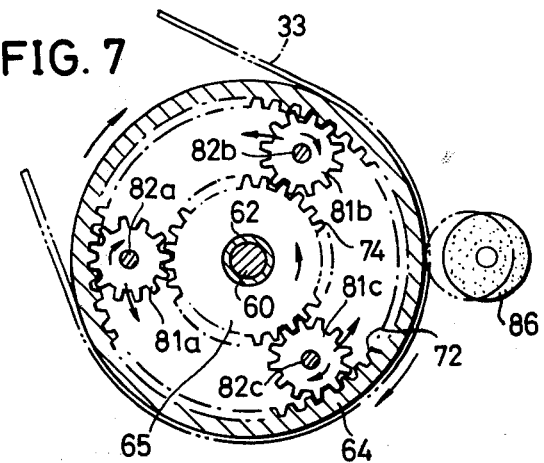
FIG. 7 is a transverse sectional view taken along VII—VII in FIG. 2, showing a planetary gear mechanism.

The driving roller 85 presses against the disc 65 and rotates it in the counterclockwise direction in FIGS. 7 and 8. As the disc 65 rotates, the pinions 81a, 81b, and 81c respectively meshed with the external gear 74 rotate clockwise. Moreover, the load on the tape is exerted on the reel engaging disc 63.

Here, when the brake band 33 is tensioned to some extent and a braking force is exerted on the brake disc 64, the pinions 81a, 81b, and 81c rotate about their axes and also revolve around the external gear 74. The rotation of the pinions 81a through 81c about their axes causes the brake disc 64 to rotate clockwise by way of the internal gear 72. The revolving of the pinions 81a through 81c around the external gear 74 causes the reel engaging disc 63 to rotate counterclockwise by way of the disc plate 77, the hub 75, and the bearing sleeve 62, whereby the tape 12 is wound around the tape roll 13.

The brake disc 64 rotates clockwise, that is in the same direction as in the aforementioned normal recording/reproducing mode and as a result the tape-tension control servo-mechanism comprising the brake band 33, the tension lever 30, and the like operates normally and without trouble.

When the brake disc 64 rotates clockwise and the reel engaging disc 63 rotates counterclockwise, the one-way clutch mechanism assumes the state indicated in FIG. 6. The clutch ring 73 moves until its thick end abuts against a step part 70b formed at the wider part of the groove, whereby the intimate contact between the outer surface of the clutch ring 73 and the wall surface 70a of the cam groove 70 and between the inner surface of the clutch ring 73 and the peripheral surface of the circular projection 64a is released. Accordingly, the brake disc 64 and the reel engaging disc 63 respectively rotate freely in opposite directions as described above.

Moreover, in the process of winding the tape, any increase in tape-tension acts on the tension pole 47 and causes the tension lever 30 to rotate clockwise against the force of spring 55. The rotation of the tension lever 30 causes the brake band 33 to be relaxed, and the load on the brake disc 64 decreases. Accordingly, the rotating speed of the brake disc 64 increases, and the rotational force of the pinions 81a through 81c around the external gear 74, that is the tape winding force of the reel engaging disc 63, decreases. Consequently, the tape tension decreases.

Conversely, when the tape-tension decreases, the tension lever 30 is rotated counterclockwise by the force of the spring 55 to tension the brake band 33 thus increasing the braking force against the brake disc 64. Accordingly, the rotating speed of the brake disc 64 decreases, and the rotational force of the pinions 81a through 81c, that is the tape winding force of the disc 63, increases. Consequently, the tape tension increases.

As a result, in the reverse reproducing mode as in the normal recording/reproducing mode, the tension of the tape 12 near the tape roll 13, which assumes the function of a tape take-up roll, is controlled at a predetermined value determined by such factors as the spring constant of the spring 55.

Search Rewinding Mode:

In searching for the position on the tape where a particular video signal has been recorded, the operation is switched to search rewinding mode which is carried out in the state shown in FIG. 1. Upon switching to this mode of operation, the pinch roller 54 separates from the capstan 46, the driving roller 85 presses against the disc 65, the rewinding idle wheel 86 presses against the discs 64 and 65, and the tension lever 30 rotates clockwise, whereby the tape-tension servo-mechanism assumes its inoperative state.

Accordingly, the discs 65 and 64 rotate unitarily, and the pinions 81a through 81c revolve around the external gear 74 without rotating about their axes, thus causing the disc 63 to rotate counterclockwise. As the disc 63 thus rotates, the tape 12 travels at a high speed in the reverse direction along the tape path indicated in FIG. 1. As a consequence, the reproduction in the reverse direction is conducted at a high speed so that the desired picture can be quickly located.

Normal Rewinding Mode:

In normal rewinding mode, the mechanism of the apparatus shown in FIG. 1 operates in the same manner as in the above described search rewinding mode so as to rewind the magnetic tape 12 at a high speed. That is, the operation is conducted with the pinions revolving about the expernal gear 74 but without rotating about their own axes and in a state with the tape accomodated within the cassette 10.

Next, the relationship among the rotating speeds of constituent elements of the supply reel disc assembly 32, at the time of the above described reverse reproducing mode, will be described particularly in reference to FIG. 9.

In the same figure:

$\theta_1$(rad/sec) $\equiv$ constant: angular velocity of driving disc 65, $n_1 = \theta_1/2\pi \equiv$ constant: rotating speed of driving disc 65, $\theta_2$(rad/sec): angular velocity of pinions 81 (81a through 81c) about their axes, $n_2 = \theta_2/2\pi$: rotating speed of pinions 81 about their axis, $\theta'_2$(rad/sec): angular velocity of pinions 81 around gear 74, $n'_2 = \theta'_2/2\pi$: rotating speed of pinions 81 around gear 74, $\theta_3$(rad/sec): angular velocity of brake disc 64, and $n_3 = \theta_3/2\pi$: rotating speed of brake disc 64.

Figure 9:
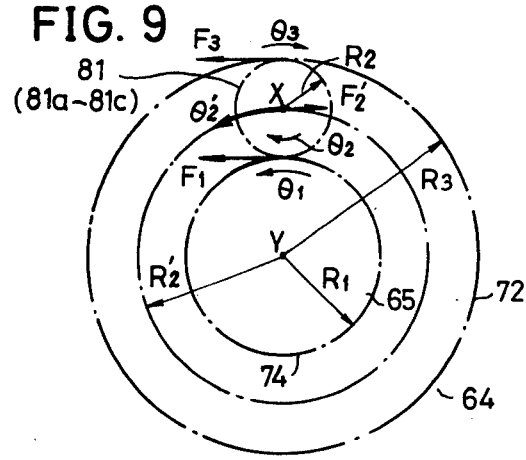
FIG. 9 is a view showing the operation of the planetary gear mechanism illustrated in FIG. 7.

Here, as is apparent from FIG. 9, the relationship between the rotating speed of the driving disc 65 and the rotating speeds of the pinions 81 (81a through 81c) about their axes and around the gear 74 are expressed by the following equation.

$$R_1\theta_1 = R_2\theta_2 + R'_2\theta'_2 \tag{1}$$

The relationship between the rotating speeds of the pinions 81 about their axes and around the gear 74, and the rotating speed of the brake disc 64 are expressed by the following equation $$R_3\theta_3 = R_2\theta_2 - R'_2\theta'_2 \qquad (2)$$

By adding the respective sides of Eq.(1) and Eq.(2), the following equation is obtained $$\theta_2 = (R_1\theta_1 + R_3\theta_3)/2R_2 \qquad (3)$$

Moreover, by substracting Eq.(2) from Eq.(1), the following equation is obtained.

$$\theta'_2 = (R_1\theta_1 - R_3\theta_3)/2R'_2 \qquad (4)$$

The above Eqs.(1) and (2), and Eqs.(3) and (4) are general equations which express relations of rotating speed.

Next to be described is the torque imparted to the reel engaging disc 63 at the time of reverse reproducing mode.

Referring again to FIG. 9, in response to a force $F_1$ acting on the driving disc 65, the following two forces are generated: a force $F'_2$ acting as a rotational force on the disc 63 and a load $F_3$ applied to the brake disc 64 by means of the brake band 33. Specifically, the balance of forces at a point X (shafts 82a through 82c) is expressed as follows.

$$F'_2 = F_1 + F_3 \qquad (5)$$

Moreover, the balance of input power and output power is expressed as follows.

$$F_1 R_1 \theta_1 = F'_2 R'_2 \theta'_2 + F_3 R_3 \theta_3 \qquad (6)$$

From Eq.(5) and Eq.(6), the following equation is obtained.

$$F_2 = \frac{R_1\theta_1 + R_3\theta_3}{R_1\theta_1 - R'_2\theta'_2} F_3 \qquad (7)$$

$$= \frac{R_1 n_1 + R_3 n_3}{R_1 n_1 - R'_2 n'_2} F_3$$

While, the rotational torque Qr of the reel engaging disc 63 is expressed as follows $$Qr = F'_2 \cdot R'_2$$

When the Eq.(7) is substituted in this equation, the following equation is obtained.

$$Qr = \frac{R_1 n_1 + R_3 n_3}{R_1 n_1 - R'_2 n'_2} F_3 \cdot R'_2 \qquad (8)$$

Furthermore, the braking torque Qb of the brake band 33 is expressed as follows.

$$Qr = F'_2 \cdot R'_2 \qquad (9)$$

By substituting Eq.(9) in Eq.(8), the rotational torque Qr is obtained as follows.

$$Qr = \frac{R_1 n_1 + R_3 n_3}{R_1 n_1 - R'_2 n'_2} \times \frac{R'_2}{R_3} Qb \qquad (10)$$

As apparant from Eq.(10), the rotational torque Qr of the reel engaging disc 63 has a proportional relationship with the braking torque Qb, whereby the rotational torque Qb can be controlled by changing the braking torque Qb appropriately.

Figure 10:
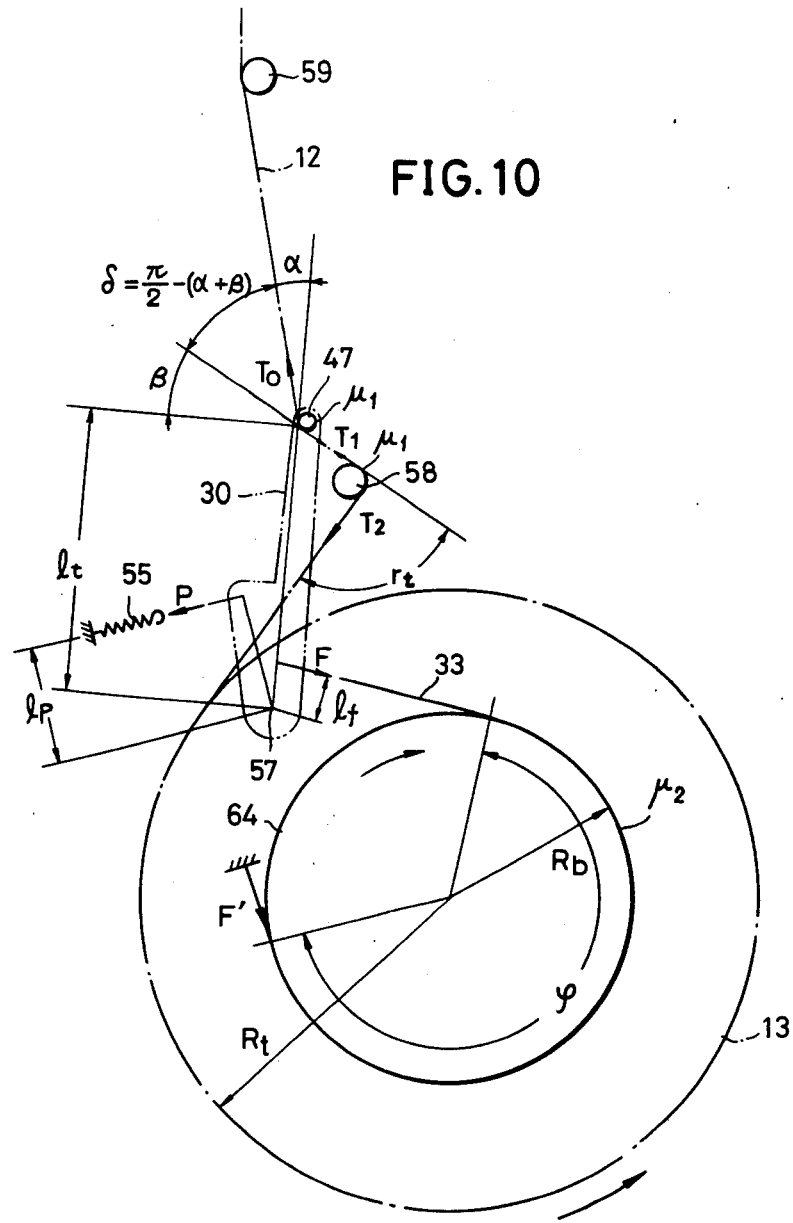
FIG. 10 is a diagrammatic illustration showing the operating state, at the time of reverse reproducing mode, of a mechanical tension servo mechanism which operates cooperatively with a reel disc device of the present invention.

Next, the tape-tension servo operation in the reverse reproducing mode will be described in reference to FIG. 10.

Moment of the tension lever 30 about its rotational fulcrum (shaft 57) is expressed as follows.

$$(T_0 \sin \alpha + T_1 \cos \beta) l_t + F l_f - P l_p = 0 \qquad (11)$$

where:
$T_0$, $T_1$: tape-tension at the position of tension pole 47,
F: tension of brake band 33, and
P: tensile force of coil spring 55.
Tape-tensions $T_1$ and $T_2$ at position of the guide pin 58 are expressed as follows.

$$\left. \begin{array}{l} T_1 = T_0 e^{\mu_1 \delta} \\ T_2 = T_1 e^{\mu_1 \gamma_t} = T_0 e^{\mu_1(\delta + \gamma_t)} \end{array} \right\} \qquad (12)$$

where $\mu_1$ is the coefficient of friction between the magnetic tape 12 and the tension pole 47 and between the tape 12 and the guide pin 58.

On the other hand, the relationship between the braking torque Qb acting on the brake disc 64 and the tension F of the brake band 33 is expressed as follows.

$$Qb = Rb(F - F')$$

$$F' = Fe^{-\mu_2 \phi}$$

$$\therefore Qb = Rb\, F(1 - e^{-\mu_2 \phi}) \qquad (13)$$

where $\mu_2$ is the coefficient of friction between the brake disc 64.

When this Eq.(13) is substituted in Eq.(10), the rotational torque Qr of the reel engaging disc 63 becomes as follows.

$$Qr = \frac{R_1 n_1 + R_3 n_3}{R_1 n_1 - R'_2 n'_2} \cdot \frac{R'_2}{R_3} \cdot R_6 F(1 - e^{-\mu_2 \phi}) \qquad (14)$$

Furthermore, a relationship between the tape-tension $T_2$ and the rotational torque Qr of the disc 63 is expressed as follows.

$$T_2 = Qr/R_t$$

that is, $$T_0 e^{\mu_1(\delta + \gamma_t)} = Qr/R_t \qquad (15)$$

By substituting Eq.(14) in Eq.(15), the following equation is obtained.

$$T_0 e^{\mu_1(\delta+\gamma_t)} = \frac{R_1 n_1 + R_3 n_3}{R_1 n_1 - R'_2 n'_2} \cdot \frac{R'_2}{R_3} \cdot \frac{Rb}{R_t} (1 - e^{-\mu_2 \phi}) F$$

Here, by putting $$\frac{R_1 n_1 + R_3 n_3}{R_1 n_1 - R'_2 n'_2} \cdot \frac{R'_2}{R_3} \cdot \frac{Rb}{R_t} \cdot (1 - e^{-\mu_2 \phi}) \equiv K \qquad (16)$$

into the above equation, the tension F of the brake band 33 is obtained as:

$$F = (1/K) T_0 e^{\mu_1(\delta + \gamma_t)} \qquad (17)$$

Moreover, from Eq.(4), $n_3$ is obtained as follows.

$$n_3 = (R_1 n_1 - 2R'_2 n'_2)/R_3$$

By substituting this expression in Eq.(16), the following equation is obtained.

$$K = (2R'_2 Rb/R_3 Rt)(1 - e^{-\mu_2 \phi})$$

Then, by substituting Eq.(16) in Eq.(11) and rearranging it in terms of tape-tension $T_0$, the following equation is obtained.

$$T_0 = \frac{P \cdot l_p}{l_t(\sin\alpha + e^{\mu_1 \delta} \cos\beta) + \frac{1}{K} l_f e^{\mu_1(\delta + \gamma t)}} \quad (18)$$

As is apparent from this Eq.(18), the tape-tension $T_0$ is in proportion to $P \times l_p$, that is, to the rotational moment of the tension lever 30 caused by the coil spring 55. This means that the tape tension is determined by the spring constant of the coil spring 55.

Figure 11:
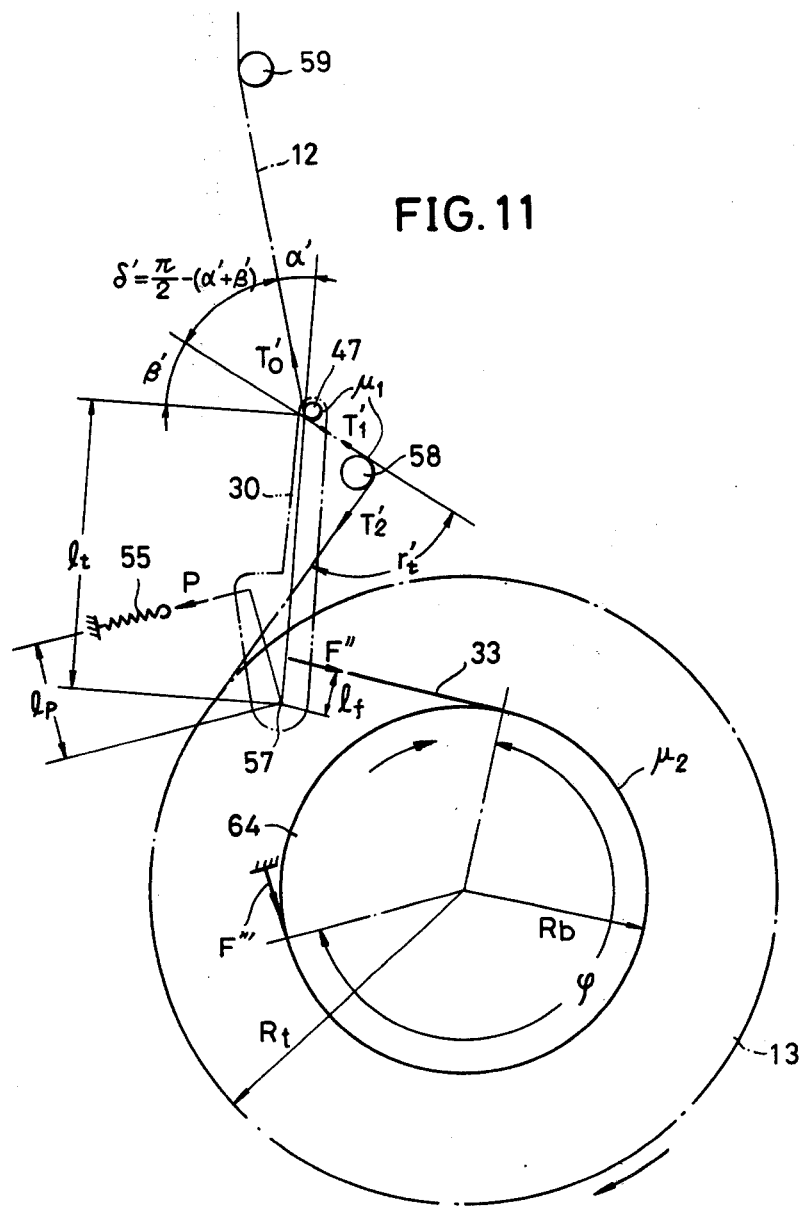
FIG. 11 is a diagramatic illustration showing the operating state of a mechanical tension servo mechanism, at the time of normal recording/reproducing mode.

The tape-tension servo operation in the normal recording/reproducing mode will now be described in reference to FIG. 11.

The moment of the tension lever 30 about its rotational fulcrum (shaft 57) is expressed as follows.

$$(T'_0 \sin\alpha' + T'_1 \cos\beta') l_t + F'' l_f - P l_p = 0 \quad (19)$$

where $T'_0$, $T'_1$: tape-tension at the position of tension pole 47, and $F''$: tension of the brake band 33.

Tape-tension $T'_1$ and $T'_2$ at the position of the guide pin 58 is expressed as follows.

$$\left. \begin{array}{l} T'_1 = T'_0 e^{-\mu_1 \delta'} \\ T'_2 = T'_1 e^{-\mu_1 \gamma' t} = T'_0 e^{-\mu_1(\delta' + \gamma' t)} \end{array} \right\} \quad (20)$$

On the other hand, the relationship between the braking torque $Qb$ acting on the brake disc 64 (that is, the reel engaging disc 63) and the tension $F$ of the brake band 33 is expressed as follows.

$$\left\{ \begin{array}{l} Qb' = Rb(F'' - F''') \\ F''' = F'' e^{-\mu_2 \phi} \\ \therefore Q'b = Rb F(1 - e^{-\mu_2 \phi}) \end{array} \right. \quad (21)$$

Furthermore, the relationship between the braking torque $Q'b$ and the tape tension $T'_2$ is expressed as follows.

$$T'_2 = Q'b/Rt$$

that is, $$T'_0 e^{-\mu_1(\delta' + \gamma' t)} = Q'b/Rt \quad (22)$$

Then, by substituting Eqs.(21) and (22) in Eq.(19) and rearranging in terms of tape-tension $T'_0$, the following equation is obtained.

$$T'_0 = \frac{P \cdot l_p}{l_t(\sin\alpha' + e^{-\mu_1 \delta'} \cos\beta') + \frac{Rt}{Rb(1 - e^{-\mu_2 \phi})} \cdot l_f e^{-\mu_1(\delta' + \gamma' t)}} \quad (23)$$

$$= \frac{P \cdot l_p}{l_t(\sin\alpha' + e^{-\mu_1 \delta'} \cos\beta') + \frac{1}{K'} l_f e^{-\mu_1(\delta' + \gamma' t)}}$$

As is apparent from this Eq.(23), the tape-tension $T'_0$ is proportional to $P \times l_p$, as in the reverse reproducing mode.

When Eq.(18) and Eq.(23) are compared with each other, the relationship $$K' = (Rb/Rt)(1 - e^{-\mu_2 \phi})$$

exists at the time of normal recording/reproducing operation, in contrast to the relationship $$K = (2R'_2 Rb/R_3 R_t)(1 - e^{-\mu_2 \phi})$$

at the time of reverse reproducing operation.

$K$ and $K'$ are in a proportional relationship expressed by $$K = (2R'_2/R_3) K'$$

Accordingly, it will be understood that the tape-tension servo-mechanism indicated in FIG. 1 operates with substantially similar characteristics in the normal recording/reproducing mode and in the reverse reproducing mode.

Furthermore, the reel disc device of the present invention can also be applied to recording/reproducing apparatuses of the other types than that referred to above.

Further, it is possible to obtain the same effect with the supply reel disc assembly 32 even when it is applied to a tape-tension servo-mechanism provided with a brake shoe instead of a brake band.

Also, it should be noted that the effect attained in the above described embodiment of the present invention by the use of a planetary gear mechanism can also be attained with other mechanisms such as one wherein idle wheels or rollers are interposed between the brake disc 64 and the driving disc 65 in place of the pinions 81a through 81c.

Further, this invention is not limited to these embodiments but various variations and modifications may be made without departing from the scope and spirit of the invention.

What is claimed is:

1. A reel disc device in a recording and/or reproducing apparatus having means including a capstan and a pinch roller for driving a tape to travel selectively in a normal direction and a reverse direction and drive means for rotatingly driving the reel disc device, said reel disc device comprising:

a disc for engaging a reel and rotating the same unitarily therewith;

a brake disc disposed below and as a separate structure from said reel engaging disc;

a clutch mechanism disposed between said reel engaging disc and said brake disc and adapted so that, when said reel engaging disc rotates in a tape drawing out direction, that is, the normal direction, said reel engaging disc is operatively connected to said brake disc to rotate said brake disc in the same normal direction and, when said reel engaging disc rotates in a tape winding up direction opposite to said normal direction, that is, in the reverse direction, connection between said reel engaging disc and said brake disc is released;

means for exerting a braking force on said brake disc rotating in the normal direction which means is responsive to fluctuations in the tape-tension;

a driving disc driven by said drive means to rotate in the reverse direction, when said tape is wound up; and a rotation transmission mechanism operated by the rotation of said driving disc and adapted to cause said reel engaging disc to rotate in the reverse direction and said brake disc to rotate in the normal direction.

2. A reel disc device in a recording/reproducing apparatus as claimed in claim 1 in which said rotation transmission mechanism comprises:

an internal gear formed in said brake disc;

a solar gear formed in said driving disc; and planet gears journaled on shafts rotating unitarily with said reel engaging disc and meshed with said internal gear and said solar gear.

3. A reel disc device in a recording/reproducing apparatus as claimed in claim 1 in which said rotational transmission mechanism comprising:

rotatable members fixed to a bearing sleeve on the top end of which said reel engaging disc is snugly fit, said members rotating unitarily with said reel engaging disc;

planet gears journaled on shafts embeddedly fixed to said rotatable members;

an internal gear formed in said brake disc supported rotatably on said bearing sleeve and disposed between said reel engaging disc and said rotatable members, and meshed with said planet gears; and a solar gear formed in said driving disc supported rotatably on said bearing sleeve and disposed below said rotatable member, and meshed with said planet gears.

4. A reel disc device as claimed in claim 1 in which said brake disc is a relatively thin hollow cylinder covered at the top and having an internal gear formed on the inner side surface of said hollow cylinder; and said driving disc has a central cylindrical projection engaging with the inside hollow portion of said brake disc and has a solar gear formed around said central cylindrical projection.

5. A reel disc device as claimed in claim 1 in which said brake disc is disposed below said reel engaging disc, and said driving disc is disposed below said brake disc.

6. A reel disc device as claimed in claim 1, which further comprises an idle wheel adapted to be pressed against said driving disc and said brake disc having the same outer diameter, at the time of tape rewinding mode, the rotation of said driving disc being transmitted by way of said idle wheel to said brake disc, thereby rotating said brake disc together with said driving disc.

7. A reel disc device as claimed in claim 1 in which said clutch mechanism comprising a cam member adapted to rotate unitarily with said reel engaging disc and formed with a cam groove having an arcuate inner peripheral wall; and a clutch member fitted around a cylindrical projection of said brake disc and engaged within said cam groove, said clutch member being movable between a first position where it edges into the narrow region of a gap between said arcuate inner peripheral wall of said cam member and the cylindrical projection of said brake disc and in said position causes said brake disc to be connected to said reel engaging disc thereby rotating said real engaging disc in the normal direction, and a second position where it rests in the wide part of said gap and in said position causes the mechanical connection between said brake disc and said reel engaging disc to be released.

8. A reel disc device as claimed in claim 7 in which said clutch member is an arcuate ring member having gradually decreasing thickness in the radial direction toward one end thereof.

* * * * *